US006755341B1

(12) United States Patent
Wong et al.

(10) Patent No.: US 6,755,341 B1
(45) Date of Patent: Jun. 29, 2004

(54) METHOD FOR STORING DATA IN PAYMENT CARD TRANSACTION

(76) Inventors: Jacob Y. Wong, 7110 Georgetown Rd., Goleta, CA (US) 93117; Roy L. Anderson, 1433 Dwight Dr., Glendale, CA (US) 91207

( * ) Notice: Subject to any disclaimer, the term of this patent is extended or adjusted under 35 U.S.C. 154(b) by 38 days.

(21) Appl. No.: 09/667,039

(22) Filed: Sep. 21, 2000

Related U.S. Application Data

(63) Continuation-in-part of application No. 09/659,434, filed on Sep. 8, 2000, now abandoned, which is a continuation-in-part of application No. 09/640,044, filed on Aug. 15, 2000, now abandoned, which is a continuation-in-part of application No. 09/619,859, filed on Jul. 20, 2000, now abandoned, which is a continuation-in-part of application No. 09/571,707, filed on May 15, 2000, now Pat. No. 6,592,044.

(51) Int. Cl.$^7$ ................................................. G06K 5/00
(52) U.S. Cl. ....................... 235/380; 235/380; 235/492; 235/487
(58) Field of Search ................................ 235/380, 492, 235/487, 379, 449

(56) References Cited

U.S. PATENT DOCUMENTS

| | | |
|---|---|---|
| 4,102,493 A | 7/1978 | Moreno |
| 4,437,130 A | 3/1984 | Hennessy et al. |
| 4,443,027 A | 4/1984 | McNeely et al. |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,689,478 A | 8/1987 | Hale et al. |
| 4,701,601 A | 10/1987 | Francini et al. |
| 4,707,594 A | 11/1987 | Roth |
| 4,742,351 A | 5/1988 | Suzuki |
| 4,772,782 A | 9/1988 | Nonat |
| 4,791,283 A | 12/1988 | Burkhardt |
| 4,837,822 A | 6/1989 | Crosley et al. |
| 4,849,613 A | 7/1989 | Eisele |
| 4,868,376 A | 9/1989 | Lessin et al. |
| 4,918,631 A | 4/1990 | Hara et al. |
| 4,990,759 A | 2/1991 | Gloton et al. |
| 5,130,519 A | 7/1992 | Bush et al. |
| 5,192,947 A * | 3/1993 | Neustein ................ 340/825.44 |
| 5,220,501 A | 6/1993 | Lawlor et al. |
| 5,317,636 A | 5/1994 | Vizcaino |
| 5,412,192 A | 5/1995 | Hoss |
| 5,426,283 A | 6/1995 | Berthozat et al. |
| 5,471,045 A | 11/1995 | Geronimi |
| 5,473,690 A | 12/1995 | Grimonprez et al. |
| 5,497,411 A | 3/1996 | Pellerin |
| 5,568,121 A * | 10/1996 | Lamensdorf ................ 340/539 |
| 5,585,787 A | 12/1996 | Wallerstein |
| 5,590,038 A | 12/1996 | Pitroda |
| 5,627,355 A | 5/1997 | Rahman et al. |
| 5,655,008 A | 8/1997 | Futch et al. |
| 5,689,247 A | 11/1997 | Welner |
| 5,745,555 A | 4/1998 | Mark |
| 5,754,652 A | 5/1998 | Wilfong |
| 5,754,653 A | 5/1998 | Canfield |
| 5,818,030 A | 10/1998 | Reyes |
| 5,825,871 A | 10/1998 | Mark |
| 5,831,862 A | 11/1998 | Hetrick et al. |
| 5,834,747 A | 11/1998 | Cooper |
| 5,834,756 A | 11/1998 | Gutman et al. |
| 5,844,497 A | 12/1998 | Gray |
| 5,883,810 A | 3/1999 | Franklin et al. |
| 5,884,271 A | 3/1999 | Pitroda |
| 5,905,246 A | 5/1999 | Fajkowski |
| 5,913,203 A | 6/1999 | Wong et al. |
| 5,915,226 A | 6/1999 | Martineau |
| 5,917,168 A | 6/1999 | Nakamura et al. |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A * | 9/1999 | Wong et al. ................... 705/39 |
| 6,000,832 A | 12/1999 | Franklin et al. |
| 6,003,763 A | 12/1999 | Gallagher et al. |
| 6,012,634 A | 1/2000 | Brogan et al. |
| 6,012,636 A | 1/2000 | Smith |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |

(List continued on next page.)

FOREIGN PATENT DOCUMENTS

| | | |
|---|---|---|
| AU | 732877 | 12/1998 |
| EP | 0 661 675 A2 | 5/1995 |
| EP | 0 722 241 A2 | 7/1996 |
| JP | 355143679 A | 10/1980 |
| JP | 402148374 A | 6/1990 |
| JP | 405040864 A | 2/1993 |
| WO | WO 99/38129 | 7/1999 |
| WO | WO 99/49424 | 9/1999 |
| WO | WO 99/57675 | 11/1999 |
| WO | WO 00/25262 | 5/2000 |
| WO | WO 00/30048 | 5/2000 |
| WO | WO 00/49586 | 8/2000 |
| WO | WO 00/52900 | 9/2000 |
| WO | WO 00/54208 | 9/2000 |
| WO | WO 01/46902 A1 | 6/2001 |
| WO | WO 01/50429 A1 | 7/2001 |
| WO | WO 01/54082 A1 | 7/2001 |

*Primary Examiner*—Karl D. Frech
*Assistant Examiner*—Daniel A Hess

(57) ABSTRACT

A data packet can be dynamically stored in a magnetic strip by an encoder of an electronic card and subsequently transferred to a money source after it is read by a standard magnetic stripe reader as part of a verification process of a payment card transaction. A computer contained on the electronic card can run diagnostic tests and send the results to the money source as part of the data packet. One diagnostic test monitors the battery life of the electronic card to permit the money source to replace the electronic card before its battery runs out of useful life. The data packet can also contain data input into the electronic card by the user, such as a customization variable.

10 Claims, No Drawings

U.S. PATENT DOCUMENTS

| | | |
|---|---|---|
| 6,038,492 A | 3/2000 | Nichols et al. |
| 6,047,268 A | 4/2000 | Bartoli et al. |
| 6,050,493 A | 4/2000 | Fertig |
| 6,068,184 A | 5/2000 | Barnett |
| 6,068,192 A * | 5/2000 | McCabe et al. ............ 235/487 |
| 6,075,861 A | 6/2000 | Miller, II |
| 6,089,451 A | 7/2000 | Krause |
| 6,101,477 A | 8/2000 | Hohle et al. |
| 6,132,799 A | 10/2000 | Corniglion et al. |
| 6,163,771 A | 12/2000 | Walker et al. |
| D436,620 S | 1/2001 | Webb et al. |
| 6,188,309 B1 | 2/2001 | Levine |
| RE37,122 E | 4/2001 | Levine et al. |
| 6,215,665 B1 | 4/2001 | Martin |
| 6,224,109 B1 | 5/2001 | Yang |
| 6,227,447 B1 | 5/2001 | Campisano |
| 6,230,977 B1 | 5/2001 | Johnson |
| 6,257,486 B1 | 7/2001 | Teicher et al. |
| 6,339,766 B1 | 1/2002 | Gephart |

\* cited by examiner

METHOD FOR STORING DATA IN PAYMENT CARD TRANSACTION

CROSS REFERENCE TO RELATED APPLICATIONS

The present application is a continuation-in-part of U.S. application Ser. No. 09/659,434 filed Sep. 8, 2000 now abandoned for Method for Generating Customer One-Time Unique Purchase Order Numbers from a Random Number Generator, which is a continuation-in-part of U.S. application Ser. No. 09/640,044 filed Aug. 15, 2000 now abandoned for Method for Generating Customer One-Time Purchase Order Numbers, which is a continuation-in-part of U.S. application Ser. No. 09/619,859 filed Jul. 20, 2000 now abandoned for Method for Implementing Anonymous Credit Card Transactions Using a Fictitious Account, which is a continuation-in-part of U.S. application Ser. No. 09/571,707, now U.S. Pat. No. 6,592,044 filed May 15, 2000 for Anonymous Electronic Card for Generating Personal Coupons Useful in Commercial and Security Transactions, all of which disclosures are specifically incorporated herein by reference.

The present application is related to the following five patent applications, all of which are specifically incorporated herein by reference, and all of which are being filed concurrently with the present application on the same date: Ser. No. 09/667,161 entitled "METHOD FOR ALLOWING A USER TO CUSTOMIZE USE OF A PAYMENT CARD THAT GENERATES A DIFFERENT PAYMENT CARD NUMBER FOR MULTIPLE TRANSACTIONS," Ser. No. 09/667,835, entitled "ELECTRONIC CARD FOR GENERATING A NEW CARD NUMBER WITH EACH USE WITH LED DISPLAY," Ser. No. 09/667,081, entitled "METHOD FOR USING ELECTRONIC PAYMENT CARD." Ser. No. 09/667,038, entitled "METHOD FOR CUSTOMIZING PAYMENT CARD TRANSACTIONS AT THE TIME OF THE TRANSACTIONS," and Ser. No. 09/667,082, entitled "ANONYMOUS MERCHANDISE DELIVERY SYSTEM."

FIELD OF THE INVENTION

The present invention is in the field of methods for making payments through payment cards.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made before its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come up with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

Since the issuance of U.S. Pat. No. 5,956,699, Wong and Anderson have also invented an anonymous electronic card for generating personal Coupons useful in commercial and security transactions, as well as a method for implementing anonymous credit card transactions using a fictitious account name. The present invention is an extension of these prior inventions that seeks to provide new methods for allowing a user to customize the use of one-time unique numbers that can be used in credit card transactions in the brick and mortar world, e-commerce, m-commerce and in many other applications. Because the methodology is well suited for use in hardware and software applications, it has widespread applicability to many different types of transactions. In addition, the present invention allows a user to include data in the information that is transmitted as part of a normal payment card transaction. This allows the user a great deal of flexibility in customizing use of such a card. In addition, it allows a provider of the card to receive important information as part of the normal processing of a given transaction.

SUMMARY OF THE INVENTION

The present invention is generally directed to a method for transferring a data packet from a user of an electronic card to a money source as part of a payment card transaction. The data packet is stored by an encoder in a magnetic storage medium, which is preferably a second track of a magnetic stripe, read by a standard magnetic stripe reader and submitted to a money source as part of data packet submitted for approval of a given payment card transaction.

In a first, separate aspect of the present invention, a computer in the electronic card executes a computer program, which can be a diagnostic program, to generate information that is stored in the data packet. An example of such a program is a program that checks on a battery life parameter. The program can generate a warning signal when a low battery condition is detected or a battery life signal related to an estimated remaining battery life of the battery. Such signals can be sent to the money source so that the user can be provided with a replacement electronic card either before or after the battery life drops below a selected threshold.

In other, separate aspects of the present invention, the data packet can be generated by a user of the card. The data packet can contain a customization variable or a user sequence number, or the data packet can be used to obtain the user sequence number.

Accordingly, it is a primary object of the present invention to provide a method for allowing a user to customize a given use of a payment card.

This and further objects and advantages will be apparent to those skilled in the art in connection with the detailed description of the preferred embodiments set forth below.

DETAILED DESCRIPTION OF THE PREFERRED EMBODIMENTS

The present invention is related to U.S. Pat. Nos. 5,913,203, 5,937,394 and 5,956,699, the disclosures of which are all specifically incorporated herein by reference.

The present invention builds upon the disclosure of U.S. application Ser. No. 09/571,707 filed May 15, 2000 for Anonymous Electronic Card for Generating Personal Coupons Useful in Commercial and Security Transactions. This earlier filed application describes an electronic card that contains a magnetic storage medium, which is preferably a magnetic stripe, and an encoder for generating a data packet that is stored in a designated portion of the magnetic storage medium that can be read by a standard magnetic strip reader. It also sets forth a much-simplified theory on magnetic strip technology, especially on how to encode (write) and decode (read) digital data respectively on and off a magnetic stripe used in ordinary credit cards of today. It furthers sets forth data storage mechanics of a magnetic stripe itself, including ANSI/ISO standards for Tracks 1, 2 and 3.

The preferred embodiments of the present invention provide methods to use the encoding technology already disclosed. The methodology is especially well adapted for use in electronic cards used to generate user one-time payment card numbers that are included in a data packet that is sent from a user's electronic card to a money source as part of a payment card transaction.

The present invention stores a data packet in the magnetic storage medium of an electronic card, preferably the magnetic stripe. The data packet is read by a standard magnetic stripe reader and submitted to a money source for approval of the given payment card transaction associated with the data packet. When such a data packet is read and transmitted to a money source, additional information can be conveyed within the data packet, as long as it can be conveniently read by the money source. This is why it is especially preferred that the data packet be encoded in the second track of the magnetic stripe within the field of data that can be read in a normal credit card transaction. Combination of this capacity for transmission of data with the flexibility provided by use of the encoding technology opens a communication channel for data transmission that can be exploited every time such a transaction takes place.

One way to exploit the communication channel is to use it to directly convey information from the electronic card to the money source. This can be useful in synchronizing the electronic card with the money source. For example, it can be used to provide the money source with a current sequence number of the electronic card. It can also be useful in providing the money source with results of diagnostic test programs that are periodically run by the electronic card's computer, an important example of which is remaining battery capacity Because of the limited capacity of current batteries that are useful in the type of electronic card described herein, it is possible that the battery will cease working before an expiration date of the card if the electronic card is heavily used. To solve this problem, the computer can run a program that measures remaining battery capacity or checks for a battery life parameter and generates a warning signal when a low battery condition is detected. The computer could even run a predictive program estimating when the useful battery capacity will expire based upon past usage, and this program could generate a battery life signal related to an estimated remaining battery life of the battery, which could be sent to the money source. The money source, in turn, can use such diagnostic information to send out a new electronic card to the user before the electronic card runs out of battery life. The same type of communication system can be used for other diagnostic programs that measure at least one parameter and generate a warning signal when a preselected threshold is exceeded.

Another way to exploit the communication channel is to use it to directly convey information that is generated by a user of the card to the money source. For example, the user could include a customization variable in the data packet. A detailed description of how a customization variable can be used and generated is set forth in Ser. No. 09/667,038, and a customization variable can also be used in the methods taught in Ser. No. 09/667,082.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for alerting a money source to a low battery condition of a battery used in an electronic card, comprising the steps of:
   (1) using the electronic card to conduct a plurality of payment card transactions in which a payment card number and a user identifier are submitted to the money source as part of an approval process;
   (2) executing a program on a computer of the electronic card to check for a battery life parameter and generate a warning signal when a low battery condition is detected; and
   (3) when a warning signal is generated, submitting a low battery indicator to the money source in connection with the approval process.

2. A method as recited in claim 1, wherein the program is executed each time the electronic card seeks approval of a preselected number of payment card transactions.

3. A method as recited in claim 2, wherein the program generates a battery life signal related to an estimated remaining battery life of the battery.

4. A method as recited in claim 3, comprising the further step of:
   (4) submitting a battery life indicator that is based upon the battery life signal to the money source in connection with the approval process.

5. A method as recited in recited in claim 1, comprising the further step of:
   (4) providing a user of the electronic card with a replacement electronic card before the battery life parameter drops below a selected threshold.

6. A method as recited in recited in claim 1, comprising the further step of:
   (4) providing a user of the electronic card with a replacement electronic card after the low battery indicator has been submitted to the money source.

7. A method for submitting a battery life signal from an electronic card to a money source, comprising the steps of:
   (1) using the electronic card to conduct a payment card transaction in which a payment card number and a user identifier are submitted to the money source as part of an approval process;
   (2) executing a program on a computer of the electronic card to check for a battery life parameter and generate the battery life signal; and
   (3) submitting the battery life signal to the money source in connection with the approval process.

8. A method as recited in claim 7, wherein the program is executed each time the electronic card seeks approval of a preselected number of payment card transactions.

9. A method as recited in claim 7, comprising the further step of:
   (4) providing a user of the electronic card with a replacement electronic card before the battery life parameter drops below a selected threshold.

10. A method for transferring a data packet from a user of an electronic card to a money source as part of a payment card transaction, comprising the steps of:
    generating a user one-time payment card number through use of a card number generator;
    using the user one-time payment card number as a payment card number;
    storing the data packet in a magnetic stripe of the electronic card that can be read by a standard magnetic stripe reader;
    using the standard magnetic stripe reader to read the payment card number, a user identifier and the data packet from the magnetic storage medium as part of a given payment card transaction; and
    submitting the payment card number, the user identifier and the data packet to the money source for approval of the given payment card transaction;
    wherein the one-time payment card number is correlated with a sequence number that indicates the relationship of the one-time payment card number to a sequence of one-time payment card numbers generated by the card number generator; and
    wherein the data packet can be used to obtain the user sequence number.

* * * * *